(12) United States Patent
Háckh et al.

(10) Patent No.: US 7,546,787 B2
(45) Date of Patent: Jun. 16, 2009

(54) MACHINE TOOL WITH IMPROVED CONCENTRICITY

(75) Inventors: Heinz Háckh, Aichwald (DE); Paul Helmut Nebeling, Tübingen (DE)

(73) Assignee: Walter Maschinenbau GmbH, Tübingen (DE)

( * ) Notice: Subject to any disclaimer, the term of this patent is extended or adjusted under 35 U.S.C. 154(b) by 0 days.

(21) Appl. No.: 11/881,696

(22) Filed: Jul. 27, 2007

(65) Prior Publication Data

US 2008/0022818 A1    Jan. 31, 2008

(30) Foreign Application Priority Data

Jul. 29, 2006  (DE) .......................... 10 2006 035 164

(51) Int. Cl.
*B23B 1/00*    (2006.01)
*B23B 3/00*    (2006.01)

(52) U.S. Cl. ............................... 82/1.11; 82/47; 82/118

(58) Field of Classification Search ..................... 82/47, 82/118, 903, 904; 409/141; 408/143; 358/299
See application file for complete search history.

(56) References Cited

U.S. PATENT DOCUMENTS

| | | | | |
|---|---|---|---|---|
| 3,090,896 A | * | 5/1963 | Bowden et al. | 318/632 |
| 4,222,692 A | * | 9/1980 | Pavlovsky | 409/141 |
| 6,273,783 B1 | * | 8/2001 | Kim | 451/8 |
| 6,463,835 B1 | * | 10/2002 | Segawa et al. | 82/1.11 |
| 6,477,927 B1 | * | 11/2002 | Albo et al. | 82/1.11 |
| 7,168,351 B2 | * | 1/2007 | Hirayama et al. | 82/1.11 |
| 2006/2449918 | | 11/2006 | Marquart | |

FOREIGN PATENT DOCUMENTS

| GB | 807 994 A | 1/1959 |
|---|---|---|
| WO | WO 2005/030437 A | 4/2005 |

* cited by examiner

*Primary Examiner*—Willmon Fridie
(74) *Attorney, Agent, or Firm*—R. S. Lombard; K. Bach

(57) ABSTRACT

A dynamic spindle adjustment permitting an adjustment movement for the compensation of a wobble of the body held by the work spindle is provided on the spindle bearing of a machine tool. The regulation is designed at least dynamically enough for the regulation to permit a reliable tracking of the rotating work spindle. As a result of this, one or more spindles can be moved relative to a stationary machine in such a manner that the path of a body held on the work spindle represents an ideal rotation about the desired body axis, that is, the axis of symmetry. The compensation motion can be achieved by energizing appropriate actuators of the bearing devices with sinusoidal and cosinusoidal adjustment signals, which are superimposed to produce a circular motion of the affected bearing device. This circular motion compensates for orbital motions of the misaligned body (7) held on the work spindle.

23 Claims, 4 Drawing Sheets

MACHINE TOOL WITH IMPROVED CONCENTRICITY

CROSS-REFERENCE TO RELATED APPLICATION

This application claims the priority benefits of German Application No. 10 2006 035 164.9-14 filed Jul. 29, 2006.

BACKGROUND OF THE INVENTION

The invention relates to a machine tool comprising at least one work spindle, as well as to a method for moving a workpiece or tool which is held on such a work spindle.

Today, highly precise spindle bearings predominantly equipped with anti-friction ball bearings are used. In view of achievable accuracies, rates of revolution, lubrication and useful life, such spindle bearings have been the subject of continuous development. Even though, in so doing, progress has certainly been made, current manufacturing possibilities do not allow any improvement regarding the radial and axial smoothness of running and the alignment of the supported shaft. It must be expected that some irregularities remain.

In order to deal with this problem, German publication DE 103 44 293 A1 has suggested a tool grinder comprising a machine adjustment device that initially defines the misalignment of a blank by means of an appropriate measuring device. The blank is then received by a workpiece receptacle on the working spindle. As the blank or the workpiece is being polished, this misalignment is taken into account and compensated for in that the grinding tools are guided to follow the workpiece in such a manner that the workpiece is being machined in a dimensionally stable and concentric manner, despite the misalignment.

In compensating for the wobbling motion of a workpiece that is cylindrical, for example, by means of a motion that is superimposed on the feed motion of the grinding tools, the superimposed motion is a function of the axial engagement position between the workpiece and the tool. Furthermore, referring to tools, which are not only in punctiform but linear, or even areal, engagement with the workpiece, the compensation can be difficult, or even impossible, as regards the compensation for a wobble of the workpiece by means of a movement of the tool, the workpiece being held on the rotating work spindle.

Considering this, the object to be achieved by the invention is an improved possibility for the compensation of misalignments of tools or workplaces on the work spindles.

SUMMARY OF THE INVENTION

A dynamic spindle adjustment permitting an adjustment movement for the compensation of a wobble of the body held by the work spindle is provided on the spindle bearing of a machine tool. The regulation is designed at least dynamically enough for the regulation to permit a reliable tracking of the rotating work spindle. As a result of this, one or more spindles can be moved relative to a stationary machine in such a manner that the path of a body held on the work spindle represents an ideal rotation about the desired body axis, that is, the axis of symmetry. The compensation motion can be achieved by energizing appropriate actuators of the bearing devices with sinusoidal and cosinusoidal adjustment signals, which are superimposed to produce a circular motion of the affected bearing device. This circular motion compensates for orbital motions of the misaligned body (7) held on the work spindle.

The machine tool of the present invention comprises a work spindle that is connected to an adjustment device for the dynamic adjustment of the alignment of the axis of rotation of the work spindle. Using the adjustment device, the alignment of the work spindle can be affected as a function of the angle of rotation of said work spindle. Consequently, the work spindle can be moved relative to a stationary machine body in such a manner that the motion of a body clamped to the work spindle, that is, workpiece or tool, performs an ideal rotational motion, without any eccentricity or orbital component and, optionally, without an axial component. This may be referred to as an active adjustment of the alignment of the work spindle in radial and/or axial direction, said adjustment being a function of the angle of rotation, and hence this may be referred to as an active spindle bearing. This active spindle bearing may be combined with a conventional compensating device, as in, for example, German publication DE 102 44 293 A1, where other machine axes are used for the correction of the misalignment of the rotating body.

The dynamic adjustment of the alignment of the axis of rotation by means of the adjustment device permits, for example, grinding close to the ideal cylindrical surfaces or also the machining of other formed elements in an almost ideal concentric manner relative to the desired axis of rotation, irrespective of any potential misalignments, for example, in the clamping chuck or as a result of other influences.

Basically, it is possible to design the adjustment device as a part of the bearing device. The bearing device is preferably a contactless bearing device, such as, for example a hydrostatic bearing device, an air bearing device, a magnetic bearing device or the like, Due to the influence of the individual bearing medium, that is, oil, air or magnetic field, the bearing device can be positioned relative to the axis of rotation, at least in a direction transverse to the axis of rotation. Preferably, positioning is possible in two directions at right angles to each other and transverse to the axis of rotation. However, it is also possible to configure the adjustment device in such a manner that it carries the bearing device, thus positioning it as desired. Adjustment devices that can be used are electrical adjustment devices, for example, piezo adjustment devices or even adjustment devices driven by other media, for example, hydraulic adjustment devices.

Preferably, the adjustment device is actuated by a control device which—via a sensor device or other suitable means—detects the position of rotation of the work spindle and controls the adjustment device accordingly. In addition, the control device is connected to a data source for data which define the misalignment of the body on the work spindle. The data source may be a measuring device, which detects the eccentricity of the body at two axially spaced apart points on the work spindle, for example, a laser measuring device, a haptic measuring device or the like. The data source may be a memory device in which measuring data are stored.

Preferably, the adjustment device displays an achievable adjustment frequency that corresponds to, or is greater than, the desired operative rate of revolutions of the work spindle. In so doing, it is possible, without slowing down the operating speed of the machine tool, to compensate for a potential misalignment of the body on the work spindle by using the adjustment device or the active spindle bearing. If the maximum adjustment frequency of the adjustment device is lower than the desired operative rate of revolutions of the work spindle, the operative rate of revolutions of the spindle may be reduced in order to still permit a compensation of a misalignment. In this case, however, the increase of the machining accuracy is to the detriment of the machining speed.

The detection of the misalignment of the body may occur before, as well as during, the actual machining. In so doing, contact-type and non-contact-type position sensors may be used. In so doing, the adjustment movement is preferably performed independent of the rate of revolutions of the spindle and only based on the position of the work spindle.

In order to compensate for misalignments, the appropriate elements of the adjustment device may perform a radial adjustment motion and, if desired, an axial adjustment motion. The data used for the compensation of the misalignment may exist in the machine tool itself or also in an external data source, such as, for example, a measuring machine.

In accordance with the method of the present invention, the misalignment of a body clamped to a work spindle is detected and, during the rotation of the work spindle, said spindle's rotary motion is superimposed by a wobbling motion which is such that the misalignment of the work piece is compensated for at a given position, preferably, however, compensated for overall. Consequently, increased machining accuracy can be achieved.

Additional details of advantageous embodiments of the invention are the subject matter of the drawings, the description and the claims.

BRIEF DESCRIPTION OF THE DRAWINGS

Exemplary embodiments of the invention are illustrated by the drawings, in which.

DESCRIPTION OF THE PREFERRED EMBODIMENTS

Figure 1:
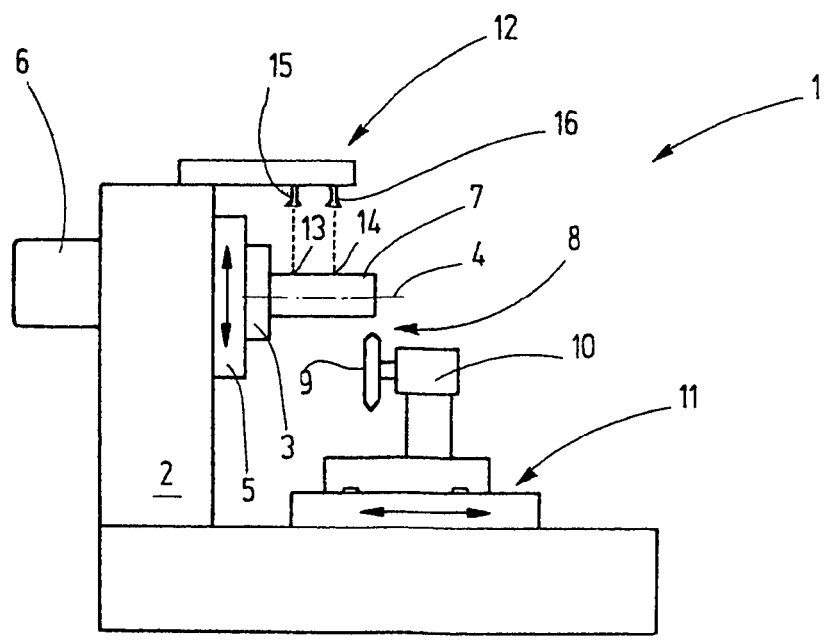
FIG. 1 is a schematic side view of a machine tool of the present invention.

FIG. 1 shows a machine tool 1 comprising a machine frame 2 on which a work spindle 3 is supported so that it can be rotated about an axis of rotation 4. The work spindle 3 may be supported, at rest, on the machine frame 2 or, as illustrated be supported so that it can be positioned in space in a linear manner or on other paths by means of one or more slides 5. The work spindle is associated with a drive 6 in order to drive the work spindle 3 in a rotating manner. The work spindle 3 may be disposed to accommodate a work piece or a tool. FIG. 1 shows this with reference to a cylindrical blank 7 which represents a workpiece. In order to machine said workpiece, a tool 8 represented in FIG. 1 by a grinding wheel 9 is used. This grinding wheel is driven by a grinding head 10 which may be supported by the machine frame 2 via a positioning device, for example, a compound slide 11. By means of said compound slide, the grinding head 10 can be positioned in various spatial directions. In addition, a rotation of the grinding head 10 about one or more axes may be provided In order to determine the alignment of the body 7, a measuring device 12 is used, said device measuring the concentricity of the body 7 at two axially spaced apart points 13, 14. To achieve this, for example, two laser measuring heads 15, 16 or other suitable measuring means may be used. The measurement may be performed before machining the body 7 and/or while it is being machined.

Figure 2:
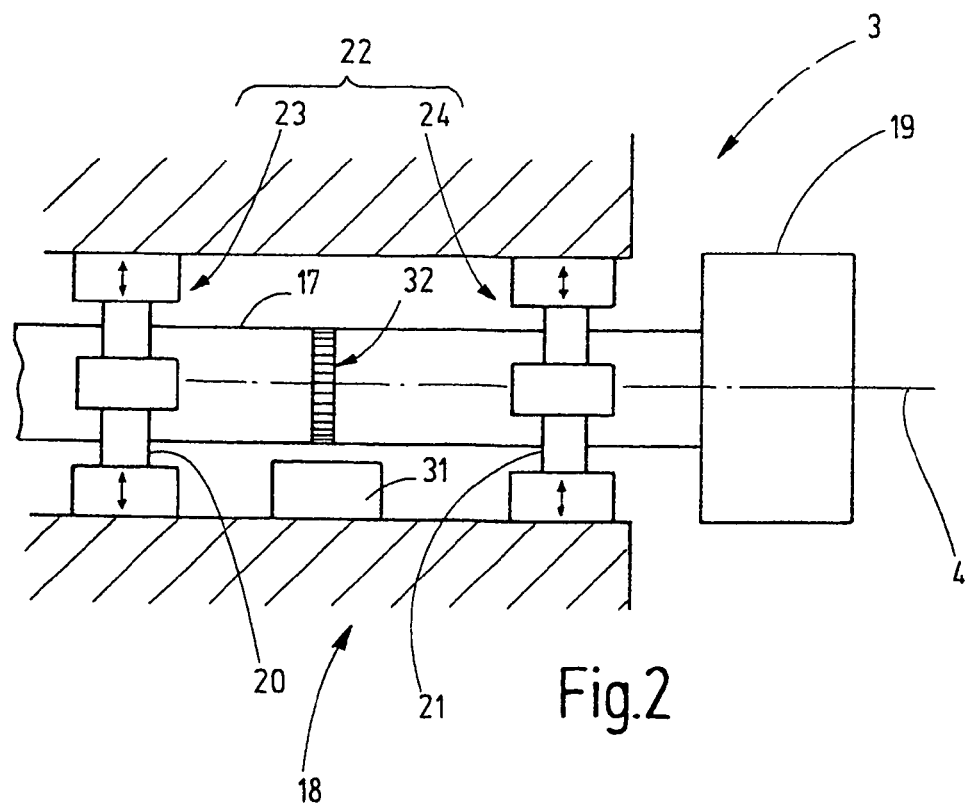
FIG. 2 is a schematic longitudinal section of the work spindle, its bearing and an associate adjustment device of the machine tool in accordance with FIG. 1.

FIG. 2 illustrates the work spindle 3 in a more detailed, even though schematic, manner. The spindle 3 is associated with a shaft 17 that is rotatably supported in a bearing device 18 and is provided on its free end with, receiving device for the body 7, for example, said receiving device being configured as clamping chuck 19. The bearing device 18 comprises at least two axially spaced apart bearings 20, 21 which are in alignment with each other and define the axis of rotation 4. The bearings 20, 21 may have any design. Preferably, they are contactless bearings, such as, for example, air bearings, hydrostatic bearings or magnetostatic bearings.

Figure 3:
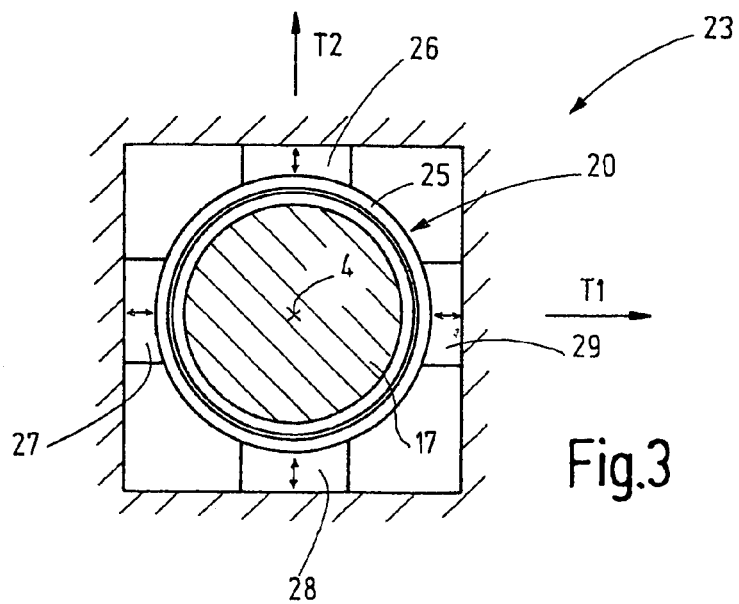
FIG. 3 is a cross-section along the line of the vertical arrows of the adjustment arrangement 23 shown in FIG. 2.
Figure 6:
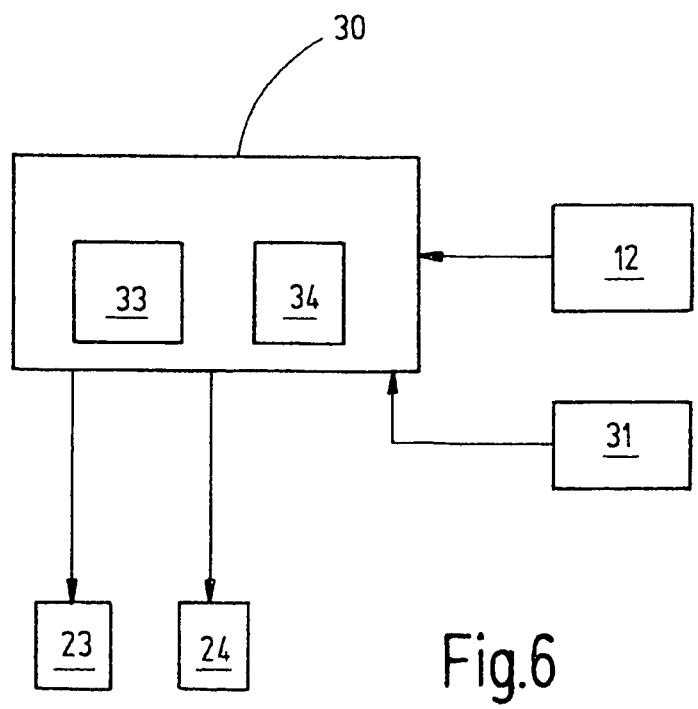
FIG. 6 is a schematic diagram of the device for misalignment compensation.

The bearing device 18 is associated with an adjustment device 22 which is associated with two axially spaced apart adjustment arrangements 23, 24. They permit shifting of the center of rotation of the supported shaft 17 in at least one radial direction. Referring to the present example, shifting in all radial directions is possible. Referring to FIG. 3, the adjustment arrangement 23 will be described hereinafter as an example:

The bearing 20 is held centered on its exterior ring 25 by several, for example four, actuators, such as, for example piezo actuators 26, 27, 28, 29. In so doing, respectively two piezo actuators 26, 28; 27, 29 are arranged in pairs opposite each other. Together, the piezo actuators 26 through 29 represent a piezo adjustment device defining a first adjustment direction T1 and a second adjustment direction T2, both being oriented radially toward the axis of rotation 4. The adjustment arrangement 23 represented by the piezo adjustment device is connected to a control device 30, as shown by FIG. 6. Likewise, the adjustment arrangement 24 is connected to the control device 30. The control device 30 receives signals from the measuring device 12 and an angle transmitter 31 which detects the position of rotation of the shaft 17. The angle transmitter 31, may be accommodated, for example, in the drive 6 or, as shown by FIG. 2, in the vicinity of the shaft 17 and may detect a mark 32 provided on the shaft 17. Preferably, the angle transmitter 31 generates signals which define the angle of rotation of the shaft 17 in an absolute manner. Alternatively, an incremental transmitter may be used.

The control device 30 is preferably based on a computing device, for example, a microprocessor. Said control device 30 comprises a processing device 33 and a memory device 34, in which an appropriate machining program and, optionally, data regarding the misalignment of the body 7 are stored.

Figure 4:
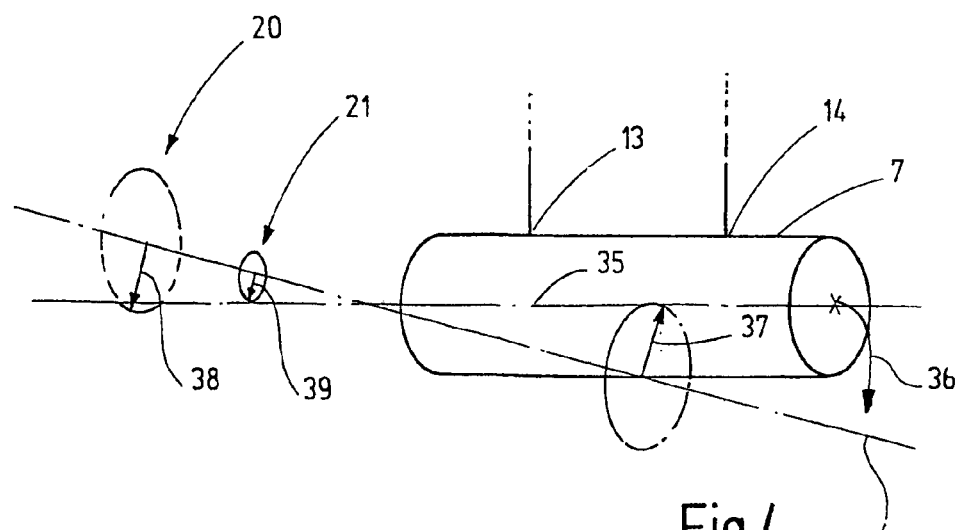
FIG. 4 is a perspective schematic illustration of the geometric relationships during the rotation of a misaligned clamped-in body on the work spindle.

The machine tool 1 described so far is disposed to operate as follows:

In order to illustrate the function, it is assumed that the body 7 on the work spindle 3—as shown in a highly exaggerated manner—is held misaligned. The axis of rotation 4 of the work spindle and the axis of symmetry 35 of the body 7 do not coincide. These axes may be next to each other or intersect in a random manner. Furthermore, they may be parallel to each other or form an acute angle. FIG. 4 shows the case in which the axis of rotation 4 and the axis of symmetry 35 pass each other diagonally without intersecting.

If the work spindle rotates about the axis of rotation 4, the body 7 performs a wobbling motion, as illustrated by an arrow 36 in FIG. 4. Each point on its axis of symmetry 35, in so doing, performs an orbital movement about the axis of rotation 4. The eccentricity of the selected point on the axis of symmetry 35 is illustrated by a radial arrow 37 in FIG. 4. Referring to FIG. 4, the axis of symmetry 35 also performs an orbital movement, as indicated by the radial arrows 38, 39, in the region of the bearings 20, 21 indicated only strictly symbolically by reference arrows. This applies to the adjustment arrangements 23, 24 at rest, that is, when the shaft 17 does not perform any radial movements.

When calibrating the machine tool 1, the wobbling motion of the body 7 is tracked, in that the shaft 17 is rotated about the axis of rotation 4, and the motion of the body 7 is tracked at the points 13, 14. The resultant data are stored, for example, in the memory 34.

Figure 5:
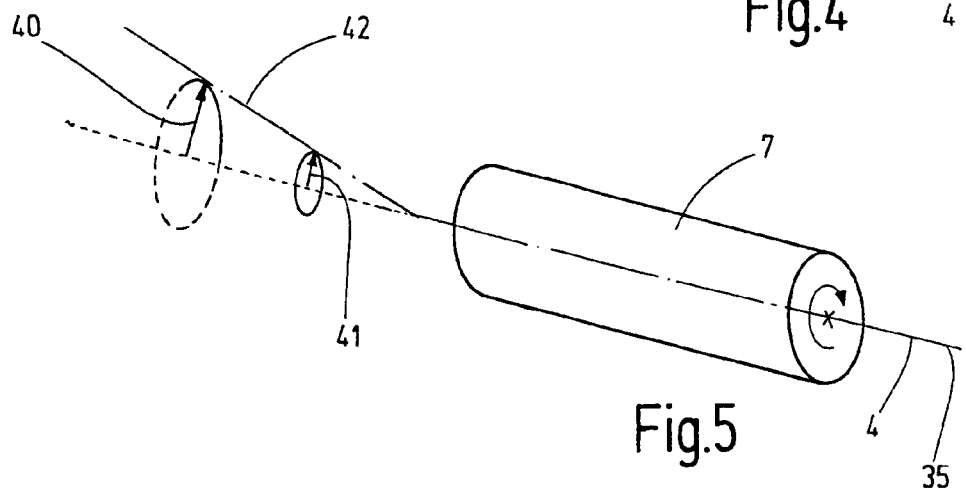
FIG. 5 is the body in accordance with FIG. 4, during its rotation with compensated misalignment.

If data are recorded to that extent, i.e., the eccentricities at the points 13, 14 are determined, this can be used to compute the eccentricities obvious from radial arrows 38, 39. These are inverted, that is, converted by computation into radial arrows 40, 41 that compensate for the radial arrows 38, 39. At least in the simple case, when the axis of rotation 4 and the axis of symmetry 35 intersect, the radial arrow 40 is obtained in that the radial arrow 38 is rotated by 180 degrees about the axis of rotation 4. Analogously, this applies to the radial arrows 39, 41. Thereafter, the adjustment arrangements 23 are energized by the control device 30 in such a manner that the shaft 17 is radially shifted as pre-specified by the radial arrows 40, 41. The shift described by the radial arrows 40, 41 rotates as the shaft 17 rotates, that is, the piezo actuators 26 through 29 are energized in accordance with the current angle of rotation of the shaft 17. Thus, the shaft 17 performs a wobbling movement, in the course of which said shaft's axis 42 moves on a conical or frusto-conical path as indicated in FIG. 5. Consequently, the axis of symmetry 35 and the axis of rotation 4 are brought to coincide—Hence, the body 7 performs a purely ideal rotary motion.

Figure 7:
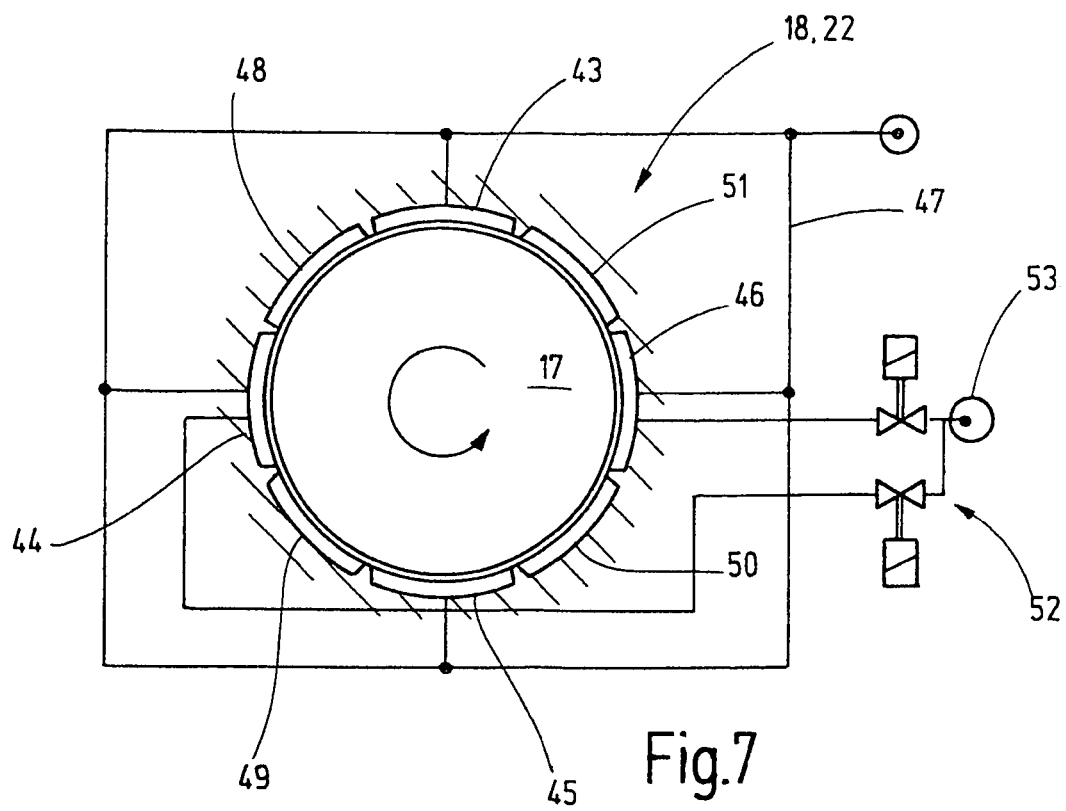
FIG. 7 is an extremely schematic illustration of a hydrostatic bearing device with misalignment compensation in at least one direction.

Referring to the above description, it was assumed that the bearing device and the adjustment device consist of separate modular units. FIG. 7 shows a modified embodiment, in which the bearing device 18 and the adjustment device 22 form an inseparable unit. In this case, the bearing device 18 is represented by a hydrostatic bearing device for the support of the shaft 17. At least three, preferably four, pockets 43, 44, 45, 46 distributed on the circumference of a bearing bore are provided, said pockets being filled with pressurized oil by an oil feed line 47. The edges of the pockets 43 through 46 form a narrow gap with the shaft 17. Between the pockets 43 through 46, oil catch pockets 48, 49, 50, 51 are provided, said pockets draining oil flowing through the gap. Two oppositely located pockets 44, 46 are connected—via a valve device 52—to a source 53 for pressurized hydraulic fluid, for example, oil, to which a greater pressure is applied. By targeted application of increased pressure to the pocket 44 or to the pocket 46, the shaft 17 can be shifted out of its central position. Although the achievable adjustment stroke is merely a few fractions of a millimeter, the adjustment path can be sufficient for precision applications. Likewise, alternating pressures may be applied—via valves—to the pockets 43, 45 if an adjustment in horizontal direction, as well as in vertical direction, is desired.

Referring to the above description, the body 7 represents the workpiece, and the grinding wheel 8 represents the tool. Instead of the grinding wheel 8, however, also a workpiece may be provided, in which case the body 7 represents the tool, for example, a grinding tool.

Figure 8:
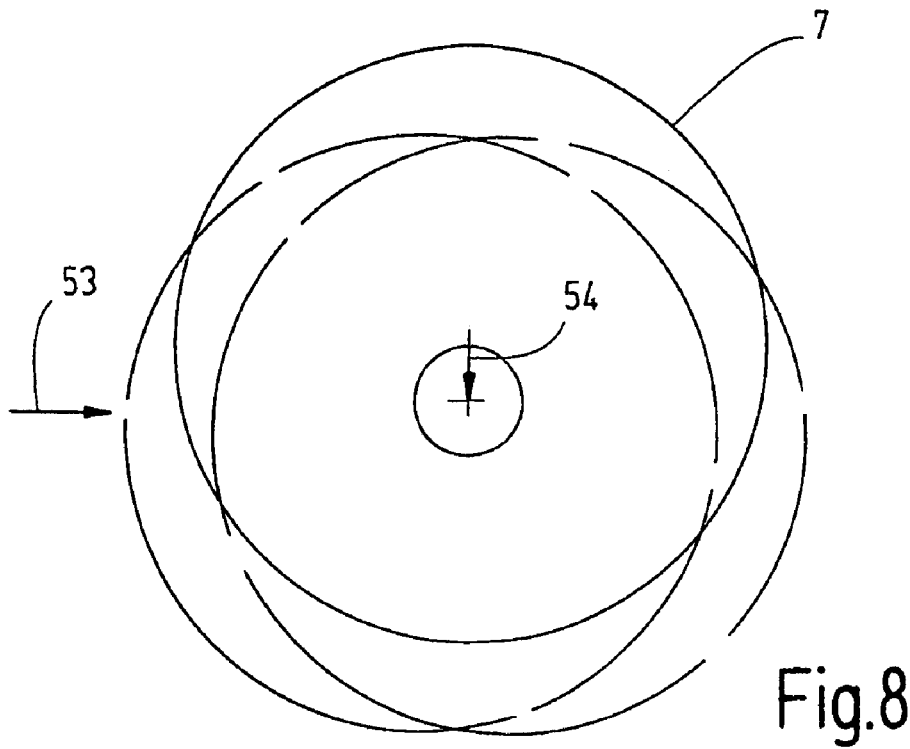
FIG. 8 is a schematic geometric illustration of a cylindrical misaligned body; and, FIG. 9 is a schematic geometric illustration of a misaligned cylindrical body, with at least one misalignment compensated for in one direction.
Figure 9:
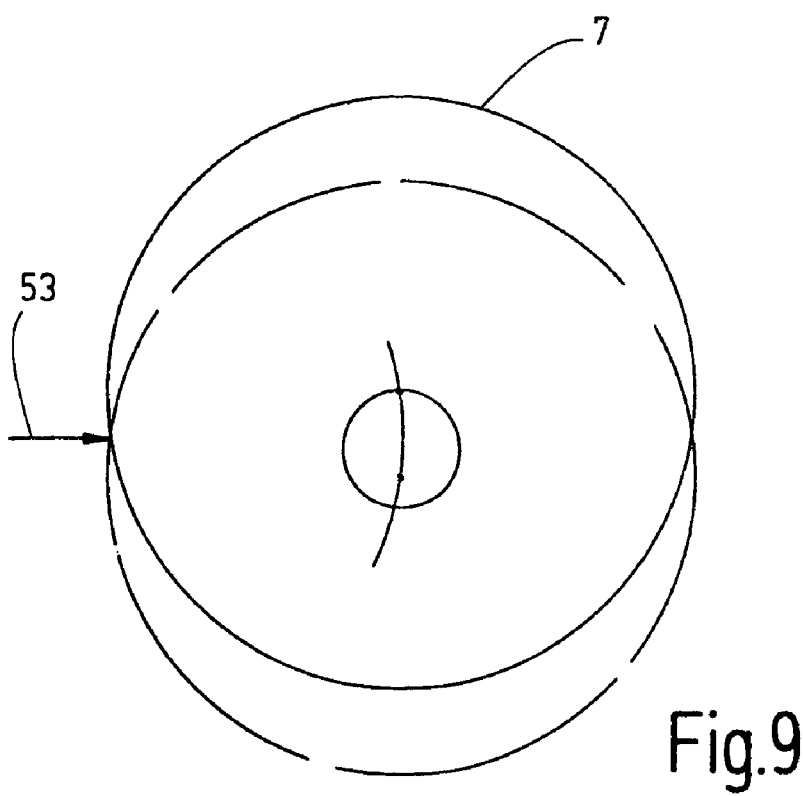

Referring to the above-described exemplary embodiments, it was assumed that the wobbling motion of the body 7 is compensated for in all radial directions, that is, compensated for completely, in order to achieve an ideal rotary motion. Referring to less complex cases, however, it may be sufficient, to compensate the wobbling motion only at one or several select points, as is illustrated by FIGS. 8 and 9. Referring to FIGS. 8 and 9, an arrow 53 symbolizes the point at which material is to be removed, for example, by means of a cutting-type machining process. If an eccentricity 54 exists, as indicated by FIG. 8, a precise machining of the body 7 is not possible. However, if the eccentricity 54 is compensated for in one direction that is identical to the advance direction of the tool in accordance with the arrow 53, the body 7, as illustrated by FIG. 9, indeed still performs a wobbling motion transverse to the advance direction 53; however, the component acting in advance direction 53 has been eliminated. This type of compensation can be achieved with adjustment devices which permit an adjustment movement only in a selected radial direction. However the above-described complete compensation is preferred.

A dynamic spindle adjustment permitting an adjustment movement for the compensation of a wobble of the body held by the work spindle is provided on the spindle bearing of a machine tool. The regulation is designed at least dynamically enough for the regulation to permit a reliable tracking of the rotating work spindle. As a result of this, one or more spindles can be moved relative to a stationary machine body in such a manner that the path of a body held on the work spindle represents an ideal rotation about the desired body axis (axis of symmetry). The compensation motion can be achieved by energizing appropriate actuators of the bearing devices with sinusoidal and cosinusoidal adjustment signals, which are superimposed to produce a circular motion of the affected bearing device. This circular motion compensates for orbital motions of the misaligned body 7 held on the work spindle.

What is claimed is:

1. A machine tool (1), comprising
   a machine frame (2) provided with means (19) for supporting at least one workpiece (7) or at least one tool (8);
   at least one work spindle (3) disposed to accommodate at least one of a tool (8) and a workpiece (7) and being driven in a rotary manner with respect to the machine frame (2);
   a bearing device (18) being configured for the support of the work spindle (3) for rotating the bearing device (18) about a pre-specified axis of rotation (4);
   an adjustment device (22) for the dynamic adjustment of the alignment of the axis of rotation (4) of the bearing device (18);
   a control device (30) for providing an adjustment signal to said adjustment device (22) for the dynamic adjustment of the alignment of the axis of rotation (4) of the bearing device (18).

2. The machine tool in accordance with claim 1, wherein the adjustment device (22) is supported by the machine frame (2).

3. The machine tool in accordance with claim 1, wherein the adjustment device (22) is supported by a positioning device (5).

4. The machine tool in accordance with claim 1, wherein the adjustment device (22) comprises at least a first actuator (27, 29; 26,28) for moving the axis of rotation (4) in a first direction (Tl) transverse to the axis of rotation (4).

5. The machine tool in accordance with claim 1, wherein the adjustment device (22) comprises at least one actuator (28) for moving the axis of rotation (4) in a second direction (T2), which is oriented transverse to the axis of rotation (4) and is different from the first direction (T1).

6. The machine tool in accordance with claim 1, wherein the adjustment device (22) comprises two adjustment arrangements (23, 24) arranged at an axial distance from each other with respect to the axis of rotation {4).

7. The machine tool in accordance with claim 1, wherein the control device (30) provides for the adjustment device (22) displaying an adjustment frequency which corresponds to, or is greater than, the rate of revolutions of the work spindle (3).

8. The machine tool in accordance with claim 1, wherein the control device (30) further provides for the synchronization of the operation of the adjustment device (22) with the rotation of the work spindle (3).

9. The machine tool in accordance with claim 1, wherein the adjustment device (22) further provides for a wobble-adjusting for imparting the work spindle (3) with a wobble motion that is superimposed on the spindle's rotary motion.

10. The machine tool in accordance with claim 1, wherein the work spindle (3) comprises a receiving device (19) for at least one of a workpiece (7) and a tool (8).

11. The machine tool in accordance with claim 1, wherein the adjustment device (22) further provides for generating an adjustment motion which is inverse to the wobbling motion of the tool (7) or workpiece (8) accommodated by the work spindle (3) during the rotation about the axis of rotation (4).

12. The machine tool in accordance with claim 1, wherein the adjustment device (22) comprises a contactless bearing device.

13. The machine tool in accordance with claim 1, wherein the bearing device (22) comprises a pneumatic bearing device.

14. The machine tool in accordance with claim 1, wherein the bearing device (22) comprises a hydrostatic bearing device.

15. The machine tool in accordance with claim 1, wherein the bearing device (22) comprises a magnetic bearing device.

16. The machine tool in accordance with claim 1, wherein the bearing device (18) is disposed inside the adjustment device (22), the adjustment device (22) is for imparting an eccentricity to the bearing device (18) that can be adjusted by the adjustment signal.

17. The machine tool in accordance with claim 1, wherein the adjustment device (22) supports the bearing device (18).

18. The machine tool in accordance with claim 1, wherein the adjustment device (22) comprises piezo adjustment device (26, 27, 28, 29).

19. The machine tool in accordance with claim 1, wherein the adjustment device (22) comprises a magnetic adjustment device.

20. The machine tool in accordance with claim 1, wherein the adjustment device (22) is connected to the control device (30), the control device (30) is connected to a position-detecting device (31) for to detecting the rotary position of the work spindle (3).

21. The machine tool in accordance with claim 1, wherein the adjustment device (22) is connected to a measuring device (12) for the determination of a misalignment of the workpiece (7) connected to the work spindle (3), whereby the misalignment is a function of the rotary position of the workpiece (7).

22. A method for moving a workpiece (7) or a tool (8) in a machine tool (1) by means of a work spindle (3), said method comprising:

the workpiece (7) or the tool (8) is clamped to the work spindle (3) of the machine tool (1);

the misalignment of the workpiece (7) or tool (8) with respect to the desired axis of rotation (4) of the workpiece or tool is determined; and, during the rotation of the work spindle (3), the workpiece (7) or tool (8) is provided with an additional wobble motion in order to compensate for the misalignment of the workpiece (7) or the tool (8) at least at one fixed point (53).

23. The method in accordance with claim 22, wherein the fixed point (53) is a point, at which the workpiece (7) is in engagement with a tool (8) or the tool (8) is in engagement with a workpiece (7).

* * * * *